(12) United States Patent
Hertinger et al.

(10) Patent No.: US 8,295,956 B2
(45) Date of Patent: Oct. 23, 2012

(54) CONTROL DEVICE HAVING AN INTEGRATED MACHINE MODEL

(75) Inventors: Klaus Hertinger, Erlangen (DE); Martin Kiesel, Poxdorf (DE)

(73) Assignee: Siemens Aktiengesellschaft, München (DE)

( * ) Notice: Subject to any disclaimer, the term of this patent is extended or adjusted under 35 U.S.C. 154(b) by 1042 days.

(21) Appl. No.: 12/225,837

(22) PCT Filed: Feb. 20, 2007

(86) PCT No.: PCT/EP2007/051604
§ 371 (c)(1),
(2), (4) Date: Sep. 30, 2008

(87) PCT Pub. No.: WO2007/113047
PCT Pub. Date: Oct. 11, 2007

(65) Prior Publication Data
US 2009/0276063 A1 Nov. 5, 2009

(30) Foreign Application Priority Data
Mar. 31, 2006 (DE) .......................... 10 2006 015 029

(51) Int. Cl.
*G05B 15/00* (2006.01)
(52) U.S. Cl. ........................................................ 700/83
(58) Field of Classification Search ...................... 700/17, 700/19, 20, 83, 116
See application file for complete search history.

(56) References Cited

U.S. PATENT DOCUMENTS
4,438,459 A * 3/1984 Levine .......................... 358/406

FOREIGN PATENT DOCUMENTS
| DE | 19917102 A1 | 12/2000 |
| EP | 0747793 A2 | 12/1996 |
| EP | 1225491 A1 | 7/2002 |
| JP | 10180567 A | 7/1998 |
| JP | 2006085328 A | 3/2006 |

OTHER PUBLICATIONS

Communication from Japanese Patent Office listing cited references, received. Nov. 17, 2011, pp. 1-6.

* cited by examiner

*Primary Examiner* — John R. Cottingham
*Assistant Examiner* — Chad Rapp (57) ABSTRACT

A production machine can be controlled by a control device in accordance with a control program which is stored in the control device. The production machine has at least two elements having interfaces, which are connected to one another at the interfaces. The control device stores element descriptions of possible elements, which respectively comprise at least one list of the existing interfaces, such that the control device can determine which elements can be connected to one another. The control device also stores a desired expansion description which at least comprises which elements the production machine has and which interfaces are said to connect the elements to one another. The control device has an operator interface which an operator of the production machine can use to request the desired expansion description which can be output to the operator on the basis of the request and can be changed by the operator.

20 Claims, 5 Drawing Sheets

CONTROL DEVICE HAVING AN INTEGRATED MACHINE MODEL

CROSS REFERENCE TO RELATED APPLICATIONS

This application is the U.S. National Stage of International Application No. PCT/EP2007/051604, filed Feb. 20, 2007 and claims the benefit thereof. The International Application claims the benefits of German application No. 10 2006 015 029.5 DE filed Mar. 31, 2006, both of the applications are incorporated by reference herein in their entirety.

FIELD OF INVENTION

The present invention relates to a control device, by which a production machine is able to be controlled in accordance with a control program stored in the control device, with the production machine having at least two elements with interfaces, with said elements being connected to one another at the interfaces.

BACKGROUND OF INVENTION

Such control devices are generally known. Examples of such control devices are programmable logic controls and numerical controls.

The elements of the corresponding production machine can for example be mechanical, electrical, electronic or data systems elements. Examples of mechanical elements are a threaded spindle or a step-down gear. Examples of electrical elements are drives or a motor-driven tool holder. Examples of electronic elements are sensors or decentralized peripheral units. Examples of data systems elements are software modules or communication programs.

The interfaces of the corresponding production machines are of a diverse nature. They include mechanical interfaces, electrical interfaces, data systems interfaces and more besides.

For orderly operation of the production machine it is necessary for said interfaces to have been correctly planned into the project. Project planning is generally undertaken using modeling programs, by means of which the production machine is able to be modeled. The modeling programs run on computers which are not controllers for production machines but are commercially-available PCs.

The modeling programs include element descriptions of possible elements, with the element descriptions comprising at least a list of the available interfaces so that it is possible to determine which elements are able to be connected to one another. The modeling programs are used to create a required configuration description which includes which elements the production machine features and via which interfaces the elements are connected to one another. The required configuration description can be created and changed by an operator of the modeling program. A required configuration description already generated can also be retrieved. The created required configuration description is able to be stored in the control device of the production machine. The control device has an operator interface via which the required configuration description can be output to the operator.

Production machines are upgraded from time to time. An example of such an upgrade is the addition of a further element, the removal of an element previously present, the replacement of elements or also upgrading to a new operating mode. In order to always maintain the current configuration of the production machine in the control device, it is thus necessary in the prior art to complete the configuration change using the computer and the modeling program and to store the new required configuration description in the control device.

A printing press of modular construction which features a control device is known from EP 0 747 793 A2. Stored in each of the individual modules of the printing press is a description of the respective module. The modules "sign on" at the control device. This enables the latter to determine the present configuration of the printing press and to operate the printing press to match the present configuration determined.

A control device for a packaging machine is known from EP 1 225 491 A1. Stored in the control device are instructions for an operator of the packaging machine. The instructions can be retrieved by the operator. They specify the measures to be taken by the operator and the order in which they are to be taken in order to convert the packaging machine from a first operating mode to a second operating mode.

A project planning and diagnostic device for a electrical installation is known from DE 199 17 102 A1. The device can have a reservoir area in which element descriptions of possible elements of the electrical installation are stored. In such cases each element description can include a list of the available interfaces. This allows the project planning and diagnostic device to determine which elements can be connected to one another. The project planning and diagnostic device can also have a configuration area, in which a required configuration description is stored. The required configuration description includes at least the elements that the electrical installation features and via which interfaces the elements are connected to one another. The project planning and diagnosis device also features an operator interface via which the required configuration description can be requested by an operator of the project planning and diagnostic device, can be output to the operator as a result of the request and can be changed by the operator.

SUMMARY OF INVENTION

An object of the present invention is to further develop a control device such that the required configuration description is able to be updated in a simpler manner than in the prior art.

The object is achieved, starting from a control device of the type stated at the outset, by the control device featuring a reservoir area in which element descriptions of possible elements are stored, by the respective element descriptions at least including a list of the available interfaces, so that the control device determines which elements can be connected to one another, and by the control device having an operator interface via which the required configuration description is able to be requested by an operator of the production machine, output to the operator in response to the request and changed by the operator.

Examples of electronic elements are sensors or decentralized peripheral units. Examples of data systems elements are software modules or communication programs. In each case the elements may involve units which are included individually in the project planning of the production machine.

Preferably installation and dismantling information is also stored in the reservoir area, providing information about how the possible elements are able to be connected to one another or disconnected from one another via the interfaces. This is because it is then possible for the installation and dismantling information to also be requested by the operator via the operator interface and output to the operator at this interface.

Also preferably stored in the reservoir is commissioning information about how the possible elements are to be put into operation. This is because this makes it possible for the commissioning information to also be requested by the operator via the operator interface and output to the operator via said interface.

In an advantageous embodiment the required configuration description features parameter settings for the existing elements. The parameter settings are also able to be output to the operator via the operator interface and changed by the operator.

In a preferred embodiment of the inventive control device the required configuration description changed by the operator is able to be stored in the configuration area as an alternative to or in addition to the original required configuration description. This is because overwriting a superseded configuration is possible especially by storing alternatives to the original required configuration description. Storing additional configurations to the original required configuration description provides the option of keeping a number of frequently-needed required configuration descriptions simultaneously in the control device. In this case the required configuration description which is valid at the time should of course be flagged in the control device.

Preferably the operator can prespecify to the control device a choice of one of the interfaces of a specific element. In this case the element descriptions of the possible elements able to be connected to the chosen interface are preferably able to be output via the operator interface to the operator. Based on this arrangement user guidance during the project planning of the production machine is especially possible.

The project planning of the production machine is facilitated even further if the control device, on determining the possible elements able to be connected to the chosen interface, is also able to take account of which elements are connected to the other interfaces of the specific element. For example this allows mutual influences and incompatibilities to be taken into account.

In a preferred embodiment of the present invention the required configuration description is embodied to contain an instantiation of one of the element descriptions for each available element. This makes creating the required configuration description especially simple.

Preferably the elements present are able to be monitored for correct operation by the control device while it is controlling the production machine and in the event of a malfunction of one of the elements a message is able to be output via the operator interface to the operator. Based on the message the operator can identify the element at which the malfunction has occurred.

It is especially easy for the operator to detect the error location if the message able to be output by the control device includes a project planning diagram of the project planning machine in which the element at which the malfunction has occurred is highlighted visually.

It is possible for the control device to be able to determine an actual configuration of the production machine. In this case for example the actual configuration can be automatically stored in the control device as the present configuration by the control device.

The present configuration is requested via the operator interface by the operator and is able to be output to the operator in response to the request.

The present configuration preferably features a configuration part and an element part, with the configuration part corresponding in its format to a required configuration description and the element part containing dynamic data of the elements of the production machine.

The configuration part is preferably not able to be changed by the operator. It can be accepted as the required configuration description. The transferred required configuration description is then able to be changed again.

The element part can be at least partly modifiable by the operator.

Preferably the control device updates the present configuration during operation of the production machine.

BRIEF DESCRIPTION OF THE DRAWINGS

Further advantages and details can be found in the following description of exemplary embodiments in conjunction with the drawings. The figures show the following basic diagrams.

DETAILED DESCRIPTION OF INVENTION

Figure 1:
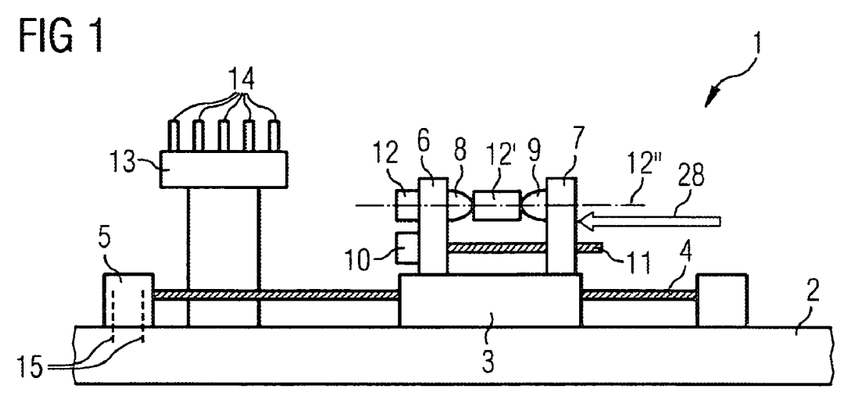
FIG. 1 a block diagram of a typical production machine.

FIG. 1 shows—purely by way of an example—a production machine 1. The production machine 1 features different elements 2 to 14. The following are shown as examples in FIG. 1:

A chassis unit 2,

A tool carriage 3, which is able to be moved by means of a carriage spindle 4 and a carriage drive 5, A first and a second workpiece holder 6, 7, each of which has a chuck 8, 9 and which can be moved by means of a holder drive 10 and a holder spindle 11 in relation to one another, A workpiece drive 12, by means of which a workpiece 12' can be rotated around an axis of rotation 12", and A tool magazine 13, containing a number of tools 14.

Elements 2 to 14 are mechanically connected to one another via interfaces. For example the carriage drive 5 is connected via schematically indicated threaded bolts 15 to the chassis unit 2. The associated bolt guides of the chassis unit 2 and of the carriage drive 5 thus represent a part of the mechanical interface between the chassis unit 2 and the carriage drive 5. Furthermore the carriage drive 5 is connected via corresponding connection elements to the drive spindle 4. This connection too represents a mechanical interface, here between the carriage spindle 4 and the carriage drive 5. Similar embodiments apply for the other of the elements 2 to 14. Thus for example the workpiece carriage 3 must be adapted to the diameter and the thread pitch of the carriage spindle 4.

Electrical interfaces are also provided, especially terminals for energy, signal and communication lines. These interfaces too must be suitably connected to one another. For example an electrical interface can have screw terminals for connecting individual conductors or can have a multipin prefabricated plug-in connector. Data systems interfaces must also be taken into account. Data transfer rate, protocol, signal type etc. are considered for example.

Figure 2:
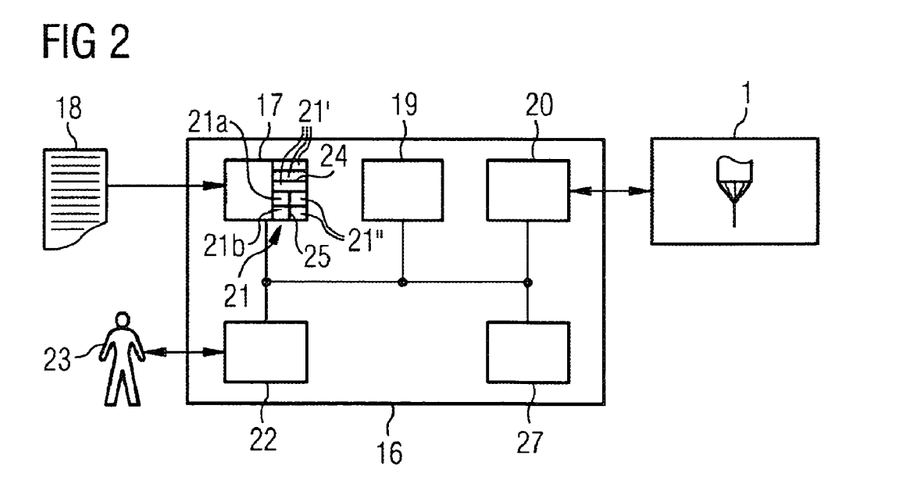
FIG. 2 a block diagram of a control device for the production machine of FIG. 1 and FIG. 3 to 6 flowcharts.

The production machine 1 is controlled in accordance with FIG. 2 by a control device 16. To this end the control device 16 has a memory 17 which holds a control program 18 as one of its programs. The control program 18 is read out and executed by a processor 19 of the control device 16. According to the control program 18 the processor 19 controls the production machine 1 via a machine interface 20.

A present configuration 21 and descriptions 21', 21" can be stored in the memory 17. The present configuration 21 and the descriptions 21', 21" can be output via an operator interface 22 to an operator 23 of the production machine 1, in some cases it is also able to be retrieved and changed. For this purpose the operator interface 22 preferably includes a visual display unit and an input device (for example keyboard and/or cursor control).

In accordance with FIG. 2 the descriptions 21' are stored in a reservoir area 24 of the memory 17, the descriptions 21" in a configuration area 25 of the memory 17.

The descriptions 21', 21" stored in the control device 16 are explained in greater detail below with reference to FIG. 3.

The descriptions 21' are element descriptions 21'. In accordance with FIG. 3 they each describe a possible element 26 of the production machine 1. The element descriptions 21'—specifically for the respective possible element 26—have the following contents:

A list of the available interfaces of the respective possible element 26 and a description of these interfaces. On the one hand the descriptions contain a plain text part which can be output via the operator interface 22 to the operator 23, on the other hand a part prepared for data processing which is used internally by the control device 16 in order to determine which other possible elements 26 are able to be connected with which of their interfaces to the respective interface of this possible element 26.

Installation information about whether the respective possible element 26 is to be connected via its interface to other possible elements 26.

Dismantling information about how the respective possible element 26 is able to be disconnected from other possible elements.

Commissioning information about how the respective possible element 26 is to be put into operation.

A list of possible parameters and the maximum or minimum permitted limit values for these parameters.

The installation, dismantling and commissioning information is held in plain text, for example in ASCII code, and is able to be output via the operator interface 22 to the operator 23.

The descriptions 21' stored in the reservoir area 24 are able to be changed by the operator 23. However it is also possible for them not to be able to be changed by the operator 23.

At least one required configuration description 21" is stored in the configuration area 25. If necessary a number of required configuration descriptions 21" can also be held in the configuration area 25. If more than one required configuration description 21" is held in the configuration area 25 there should also be a flag to indicate which of the required configuration descriptions 21" is valid (=activated) at the time.

The required configuration descriptions 21" are able to be requested via the operator interface 22 by the operator 23. If the operator 23 enters a request of this type, the requested required configuration description 21" is output by the control device 16 via the operator interface 22 to the operator 23. It can then be changed by the operator 23.

Figure 3:
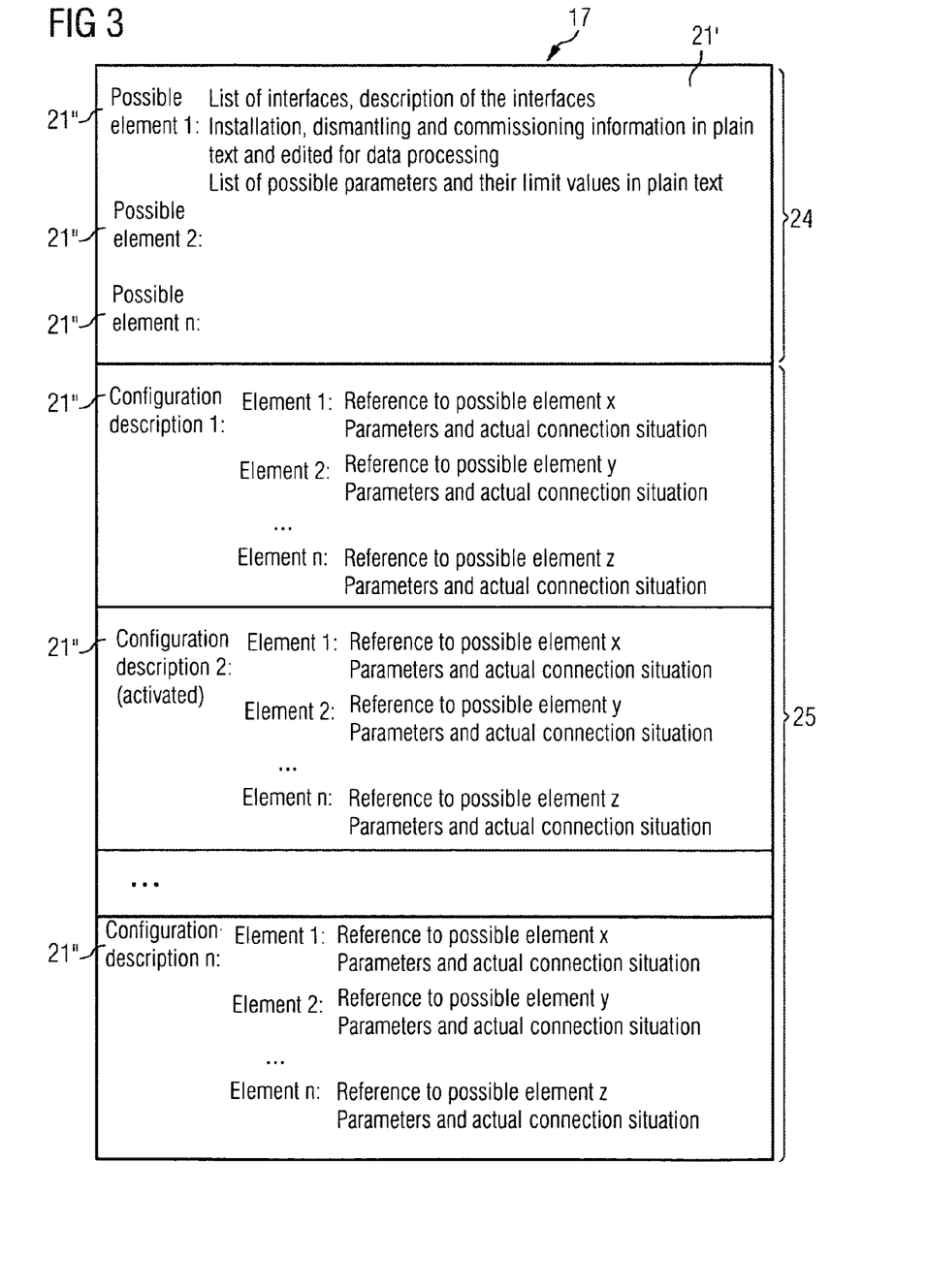

In accordance with FIG. 3 each required configuration description 21" includes for each element 2 to 14 that the production machine 1 has in accordance with the respective required configuration description 21", an instantiation of one of the element descriptions 21' which are stored in the reservoir area 24. The instantiations are parameterized. The possible parameters of the respective elements 2 to 14 are thus assigned actual values. Furthermore the respective instantiations are obviously assigned the information about which of the elements 2 to 14 are connected to the respective instantiated element 2 to 14. The required configuration description 21" thus includes which of elements 2 to 14 the production machine 1 features and via which interfaces the elements 2 to 14 are connected to one another.

The present configuration 21 can also be stored in the configuration area 25. It can be requested via the operator interface 22 by the operator 23. In the event of a request via the operator interface 22 it is output to the operator 23.

The present configuration 21 contains a configuration part 21a and an element part 21b. Both the configuration part 21a and also the element part 21b are requested by the operator 23.

The form of the configuration part corresponds to a required configuration description 21". It can be accepted by the operator 23 as the required configuration description 21". However it is not possible for the operator 23 to change the configuration part 21a. He can only make changes if he has transferred the configuration part 21a as a required configuration description 21".

The element part 21b contains dynamic data of elements 2 to 14 of the production machine 1. For example the element part 21b contains the run times, the time of the last maintenance or inspection, the wear state etc. of elements 2 to 14 of the production machine 1. The element part 21b is able—at least partly—to be changed by the operator 23.

Figure 4:
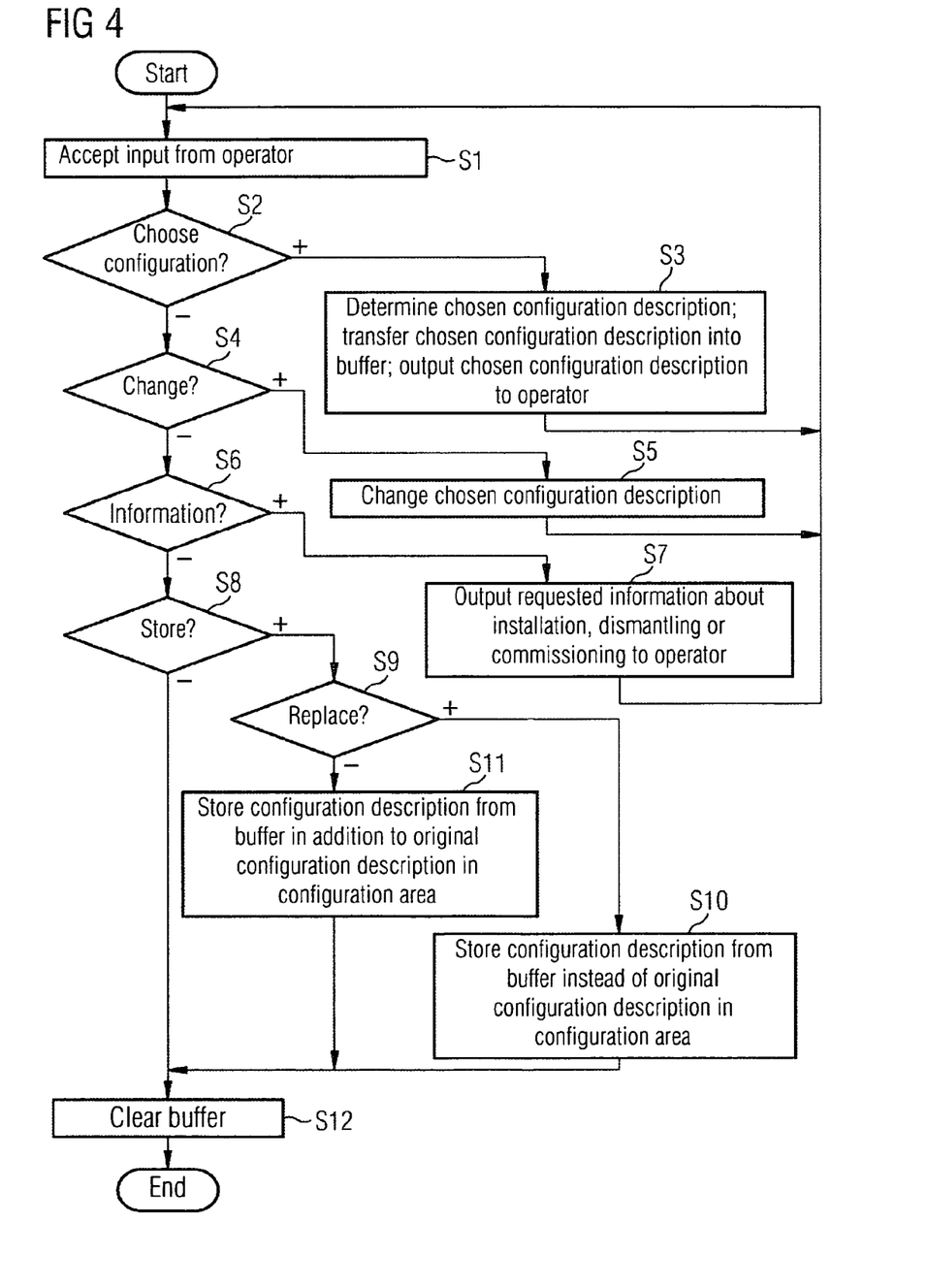

The interaction of the control device 16 with the operator 23 is now described in conjunction with FIG. 4, where it relates to the descriptions 21', 21" stored in the control device 16.

In accordance with FIG. 4 the control device 16 in a step S1, accepts an input from the operator 23 entered via the operator interface 23. In a step S2 the control device 16 tests whether the operator input is a choice of a required configuration description 21". If it is, the control device 16 determines in a step S3 which required configuration description 21" the operator 23 has chosen. In addition the control device 16 accepts the chosen required configuration description 21" into a buffer 27 and outputs it via the operator interface 22 to the operator 23.

If the input of step S1 is not a choice of a required configuration description 21", the control device, 16 tests in a step S4, whether the input of the step S1 is a change specification for the chosen required configuration description 21". If it is, the control device 16, in a step S, changes the chosen required configuration description 21" in accordance with the change specification. The changes are however only made in relation to the required configuration description 21" stored in the buffer 27. The required configuration description 21" stored in the configuration area 25 is not changed. Step S5 will be examined in more detail below in conjunction with FIG. 5.

If the input of step S1 is also not a change specification, the control device 16 tests, in a step S6, whether the input is a request to output information about installation, dismantling or commissioning of an element 2 to 14. If this is the case, the control device 16 outputs the requested information to the operator 23 in a step S7 via operator interface 22.

If the input of the step S1 is also not an information request, the control device 16 tests, in a step S8, whether previous inputs are to be stored. If they are, the control device 16 also tests, in a step S9, whether the required configuration description 21" stored in the buffer 27 is to replace the corresponding original required configuration description which is stored in the configuration area 25. If it is, the control device 16, in a step S10, stores the required configuration description 21" buffered in the buffer 27 instead of the original required configuration description 21" in the configuration area 25. Else the control device 16 executes a step S11, in which its stores the required configuration description 21" buffered in the buffer 27 in the configuration area 25 in addition to the required configuration description 21" already stored there. The control device 16 is thus able to store the required configuration description 21" changed by the operator 23 in the control device 16 as an alternative or in addition to the original required configuration description 21".

The control device 16 also then executes a step S12. In step S112 the control device 16 clears the buffer 27, provided the required configuration description 21" was previously stored there. Step S12 is also executed if the information is not to be stored in the configuration area 25.

Figure 5:
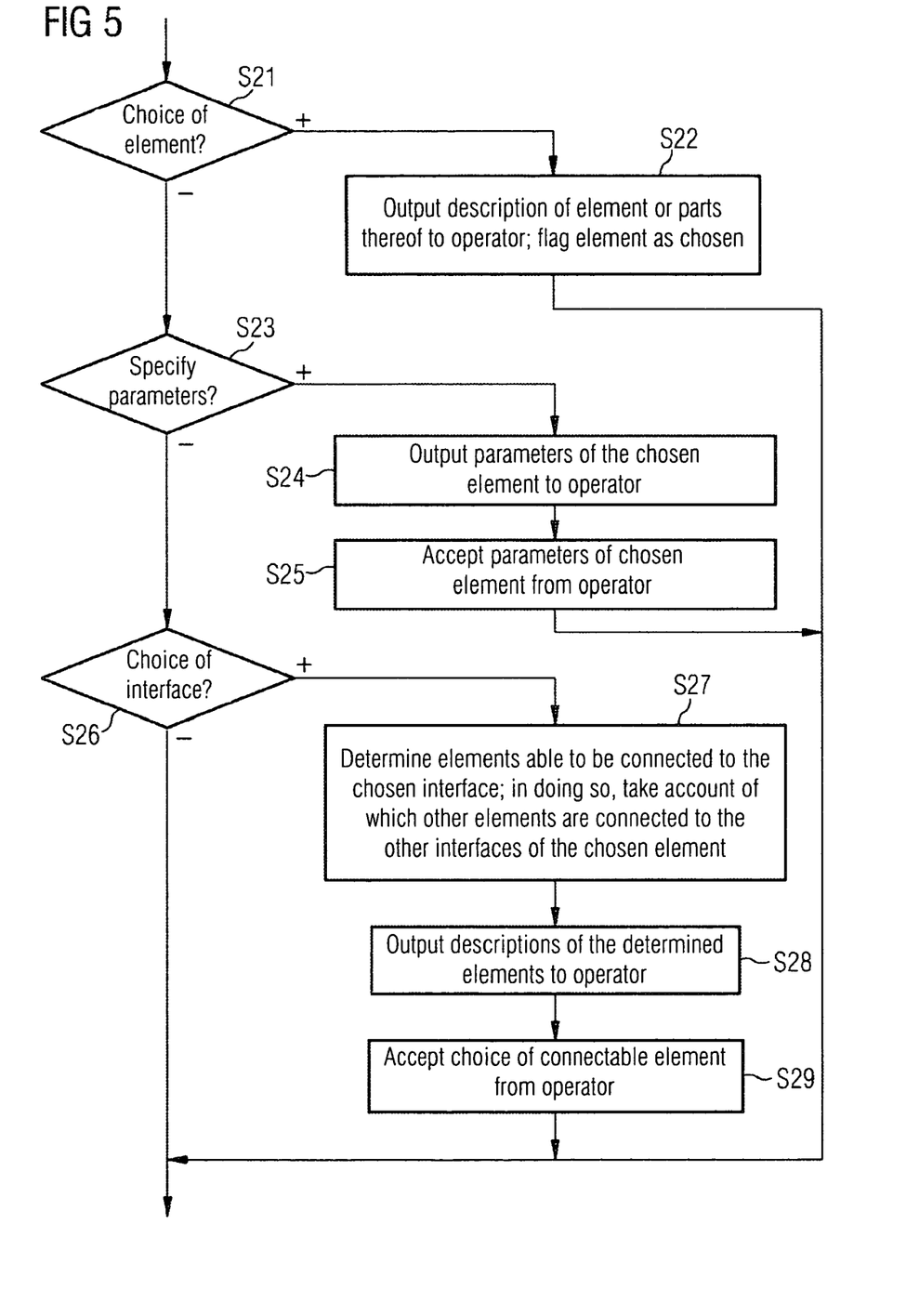

In accordance with FIG. 5, step S5 of FIG. 4 for example can be implemented as follows:

In a step S21 the control device 16 tests whether the change specification of the user 23 is a selection entry for one of the elements 2 to 14. If it is, the control device 16, in a step S22 outputs the description of the respective element 2 to 14 or at least a part of this description 23. Furthermore the control device 16 flags this element 2 to 14 internally as chosen.

If the change specification is not a choice of an element 2 to 14, the control device 16 tests, in a step 23, whether the input was a specification to change a parameter. If it is, the control device 16, in a step S24 outputs the parameters of the chosen element 2 to 14 via the operator interface 23 to the operator 22. In a step S25 it accepts the appropriate parameter specifications.

If the change specification of step S1 was neither the choice of an element 2 to 14 nor the specification of a parameter, the control device 16 tests, in a step S26, whether the operator 23 has chosen one of the interfaces of the previously chosen element 2 to 14. If he has, the control device 16 determines on the basis of the description of the chosen interface and the descriptions of the interfaces of the possible elements 26, which possible elements 26 are able to be connected to the chosen interface. When determining the possible elements 26 able to be connected to the chosen interface, the control device 16 preferably takes account of which elements 2 to 14 are already connected to the other interfaces of the specific element 2 to 14.

In a step S28 the control device 16 outputs the descriptions 21' of the possible elements 26 (or a part of the descriptions) determined in step S27 via the operator interface 22 to the operator 23. In a step S29 the control device 16 finally accepts a corresponding choice of one of the possible elements 26 from the operator 23.

Figure 6:
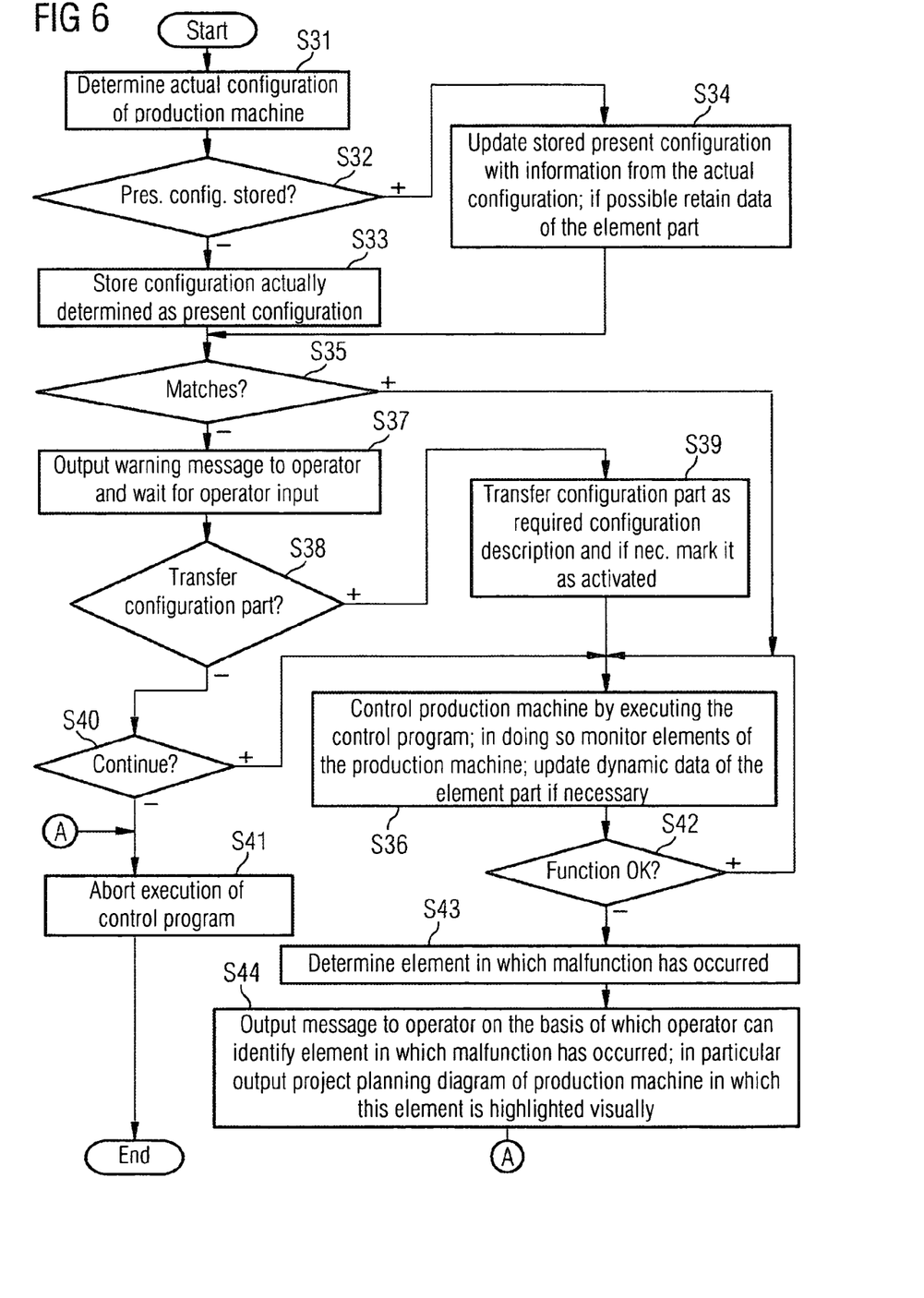

In the operation of the production machine 1 the control device 16 preferably initially determines in accordance with FIG. 6 in a step S31 the actual configuration of the production machine, provided this is possible for the control device 16.

It then tests in a step S32, whether a present configuration 21 is already stored in the configuration area 25. If no present configuration 21 is yet stored in the configuration area 25, the control device 16, in a step S33, stores the actual configuration just determined as the present configuration 21. In this case both the configuration part 21a and also the element part 21b are stored. If a present configuration 21 is already stored in the configuration area 25, the stored present configuration 21 is updated in a step S34 with the information of the actual configuration. In the updating of the present configuration 21 the configuration part 21a will be overwritten and data of the element part 21b retained, where this is sensible and possible.

In a step S35, the control device 16 tests whether the actual configuration of the production machine 1 determined in step S31 matches the configuration of the production machine 1 in accordance with the required configuration description 21" (or, for a number of required configuration descriptions 21", matches the configuration in accordance with the activated required configuration description 21"). If the actual configuration (i.e. the configuration part 21a) matches the required configuration description 21", the control device 16 branches to a step S36. If on the other hand deviations are produced, the control device 16, in a step S37, outputs a warning message to the operator 23 via the operator interface 22 and waits for an input from the operator 23.

In a step S38, the control device 16 tests whether the operator entry of step S37 is a command for accepting the configuration part 21a as the new required configuration description 21". If it is, the control device 16, in a step S39, accepts the configuration part 21a as the new required configuration description 21", if necessary marks this new required configuration description 21" as activated and moves on to step S36. Depending on the type of user entry the new required configuration description 21" can displace the previous required configuration description 21" or be stored in addition to the previously stored required configuration description 21" in the configuration area 25.

If the operator entry of step S37 is not a command for accepting the configuration part 21a, the control device 16 tests, in a step S40, whether the operator entry is a command for continuing the control of the production machine 1. If it is not, the further processing of the control program 18 is aborted in a step S41.

If a branch is made to step S36, the control device 16 controls the production machine 1 by executing the control program 18. Likewise within the framework of step S36 the control device 16 monitors the elements 2 to 14 of the production machine 1 for correct functioning. If sensible and possible, the control device 16 within the framework of step S36, can also update the dynamic data of the element part 21b.

In a step S42 the control device 16 tests whether the elements 2 to 14 are functioning correctly. If they are, the control device 16 returns to step S36. Otherwise the control device 16 determines, in a step S43, at which of the elements 2 to 14 the malfunction has occurred. In a step S44 it outputs via the operator interface 22 a message to the operator 23, on the basis of which the operator 23 can identify at which of the elements 2 to 14 the malfunction has occurred.

The message can especially be a project planning diagram of the production machine 1—e.g. a diagram similar to that shown in FIG. 1, in which there is a visual highlight to indicate in which of the elements 2 to 14 the malfunction has occurred. The visual highlight can for example consist of the element 2 to 14 in which the malfunction has occurred being shown flashing and/or in a color different from the remaining elements 2 to 14. The faulty element 2 to 14 can also be marked for example by means of an arrow 28 (see FIG. 1). A combination of different measures is also possible.

The control device 16 thus allows convenient in-situ configuration and reconfiguration of the required configuration description 21", i.e. at the production machine 1.

The invention claimed is:

1. A control device, comprising:
a reservoir area in memory, in which element descriptions of possible elements of a production machine are stored, with each element description including at least a list of the available interfaces of the respective element, such that the elements able to be connected to one another are able to be determined by the control device, wherein the production machine is able to be controlled by the control device in accordance with a control program stored in the control device, wherein the production machine has at least two elements with interfaces, with said elements being connected to one another via said interfaces;

a configuration area in the memory in which a plurality of required configuration descriptions are stored, one of which is selected as an active required configuration description that currently controls the production machine as a present configuration, wherein the required configuration descriptions at least include which elements the production machine features and via which interfaces the elements are connected to one another;

a buffer separate from the configuration area for making changes in a selected configuration; and an operator interface for selecting by an operator a configuration and for changing possible elements in the selected configuration, via which the selected configuration of the plurality of required configuration descriptions is able to be requested by an operator of the production machine, output to the operator in response to the request from the operator, and stored in the buffer separate from the configuration area to be changed by the operator, wherein the changes by the operator are implemented by receiving a choice of element to be changed, receiving a choice of interface for the chosen element, determining which possible elements are connectable elements comprising those able to be connected to the chosen interface by taking into account which other elements are connected to other interfaces of the chosen element, accepting a choice of a connectable element from the operator, and storing the changes to the selected configuration in the buffer; and wherein the selected configuration is stored back into the configuration area as a new required configuration description in place of or in addition to the selected configuration, and wherein the new required configuration description is thereafter adapted to be selectable as the active required configuration description to control the production machine as the present configuration.

2. The control device as claimed in claim 1, wherein installation and dismantling information is stored in the reservoir area about how the possible elements are to be connected to one another and disconnected from one another via the interfaces and that the installation and dismantling information is also able to be requested via the operator interface by the operator and is able to be output to the operator.

3. The control device as claimed in claim 1, wherein commissioning information is stored in the reservoir area device about how the possible elements are to be put into operation and that also the commissioning information is requestable via the operator interface by the operator and output to the operator.

4. The control device as claimed in claim 1, wherein the required configuration description features parameter settings for the available elements and wherein the parameter settings are outputted via the operator interface to the operator and changed by the operator.

5. The control device as claimed in claim 1, wherein the required configuration description in the configuration area changed by the operator is able to be stored as an alternative to or in addition to the original required configuration description.

6. The control device as claimed in claim 1, wherein a choice of one of the interfaces of a specific element is specified to the control device by the operator and wherein the element descriptions of possible elements able to be connected to the chosen interface are outputted via the operator interface to the operator.

7. The control device as claimed in claim 6, wherein the elements connected to the other interfaces of the specific element are additionally taken into account by the control device in determining the possible elements able to be connected to the chosen interface.

8. The control device as claimed in claim 1, wherein the required configuration description is formed in such a way that it has an instantiation of one of the element descriptions for each available element.

9. The control device as claimed in claim 1, wherein the available elements are able to be monitored for correct functioning by the control device during control of the production machine and wherein in the case of a malfunction of one of the available elements, a message is outputted via the operator interface to the operator, on the basis of which the operator can identify the element at which the malfunction has occurred.

10. The control device as claimed in claim 9, wherein the message outputted by the control device includes a project planning diagram of the production machine in which a visual highlight indicates at which of the elements the malfunction has occurred.

11. The control device as claimed in claim 1, wherein the control device determines an actual configuration of the production machine.

12. The control device as claimed in claim 11, wherein the actual configuration of the production machine of the control device is stored automatically in the control device as the present configuration of the production machine.

13. The control device as claimed in claim 12, wherein the present configuration is requestable by the operator via the operator interface and is outputted to the operator as a result of the request.

14. The control device as claimed in claim 12, wherein the present configuration has a configuration part and an element part, wherein the format of the configuration part corresponds to a configuration description and the element part contains dynamic data of the elements of the production machine.

15. The control device as claimed in claim 13, wherein the present configuration has a configuration part and an element part, wherein the format of the configuration part corresponds to a configuration description and the element part contains dynamic data of the elements of the production machine.

16. The control device as claimed in claim 14, wherein the configuration part cannot be changed by the operator.

17. The control device as claimed in claim 14, wherein the configuration part is able to be accepted as the required configuration description.

18. The control device as claimed in claim 14, wherein the element part is changeable at least partly by the operator.

19. The control device as claimed in claim 14, wherein the present configuration is updated by the control device during the operation of the production machine.

20. The control device as claimed in claim 15, wherein the present configuration is updated by the control device during the operation of the production machine.

* * * * *